(12) United States Patent
Orlov

(10) Patent No.: US 11,001,185 B2
(45) Date of Patent: May 11, 2021

(54) PARTICULATE MATERIAL HAULAGE ARRANGEMENT

(71) Applicant: 629 032 373 PTY LTD, Canning Vale (AU)

(72) Inventor: Denis Orlov, Canning Vale (AU)

(73) Assignee: 629 032 373 PTY LTD, Canning Vale (AU)

( * ) Notice: Subject to any disclaimer, the term of this patent is extended or adjusted under 35 U.S.C. 154(b) by 0 days.

(21) Appl. No.: 16/757,097

(22) PCT Filed: Oct. 10, 2018

(86) PCT No.: PCT/AU2018/051093
§ 371 (c)(1),
(2) Date: Apr. 17, 2020

(87) PCT Pub. No.: WO2019/079846
PCT Pub. Date: May 2, 2019

(65) Prior Publication Data
US 2020/0247298 A1    Aug. 6, 2020

(30) Foreign Application Priority Data
Oct. 23, 2017    (AU) .................. 2017904269

(51) Int. Cl.
*B60P 1/38*    (2006.01)
*B60P 1/00*    (2006.01)
*B60P 1/16*    (2006.01)
*B60P 1/36*    (2006.01)
*B65D 88/60*   (2006.01)

(52) U.S. Cl.
CPC ................. *B60P 1/006* (2013.01); *B60P 1/38* (2013.01); *B60P 1/16* (2013.01); *B60P 1/365* (2013.01); *B65D 88/60* (2013.01); *B65G 2814/032* (2013.01)

(58) Field of Classification Search
CPC ....... B60P 1/365; B60P 1/38; B65G 2814/032
See application file for complete search history.

(56) References Cited

U.S. PATENT DOCUMENTS 3,272,358 A    9/1966 Thompson
3,998,343 A *  12/1976 Fors ........................ B60P 1/006
                                                        414/501

(Continued)

*Primary Examiner* — Jonathan Snelting
(74) *Attorney, Agent, or Firm* — Michael J. Feigin, Esq.; Feigin and Fridman LLC

(57) ABSTRACT

A haulage arrangement has a frame configured for operative attachment to a suitable tractor, and defining a tray for operatively receiving particulate material therein. The tray comprises two side walls separated by a loadbearing lower section with a headwall at a head end of the tray and slidably arranged in-between the side walls. Also included is an urger at the head end configured to operatively urge the headwall to slide across the lower section. Arrangement further includes an elastically flexible floor slidably arranged on the lower section and fast at a first end with the headwall, as well as a retractor arranged at an ejection end of the tray and configured to continuously retract a second end of the floor underneath the lower section whilst the headwall is urged. The retractor is further configured to agitate the floor during retraction to counteract adhesion of particulate material ejected from the tray.

20 Claims, 12 Drawing Sheets

(56) References Cited

U.S. PATENT DOCUMENTS

| | | | | |
|---|---|---|---|---|
| 4,162,735 | A | * | 7/1979 | Lewis ............... B60P 1/006 |
| | | | | 414/514 |
| 4,531,680 | A | * | 7/1985 | Groeneweg ........... A01C 3/06 |
| | | | | 239/676 |
| 5,118,244 | A | | 6/1992 | Cook |
| 6,837,668 | B1 | | 1/2005 | Brown |
| 7,147,423 | B2 | | 12/2006 | Golden et al. |
| 8,647,044 | B2 | | 2/2014 | Stewart et al. |
| 9,663,011 | B2 | * | 5/2017 | Fliegl ............... B60P 1/365 |
| 9,789,798 | B2 | * | 10/2017 | Torrison ............. B60P 1/36 |
| 2007/0000759 | A1 | * | 1/2007 | Knapen ............... B60P 1/365 |
| | | | | 198/527 |
| 2017/0008441 | A1 | | 1/2017 | Quenzi et al. |

\* cited by examiner

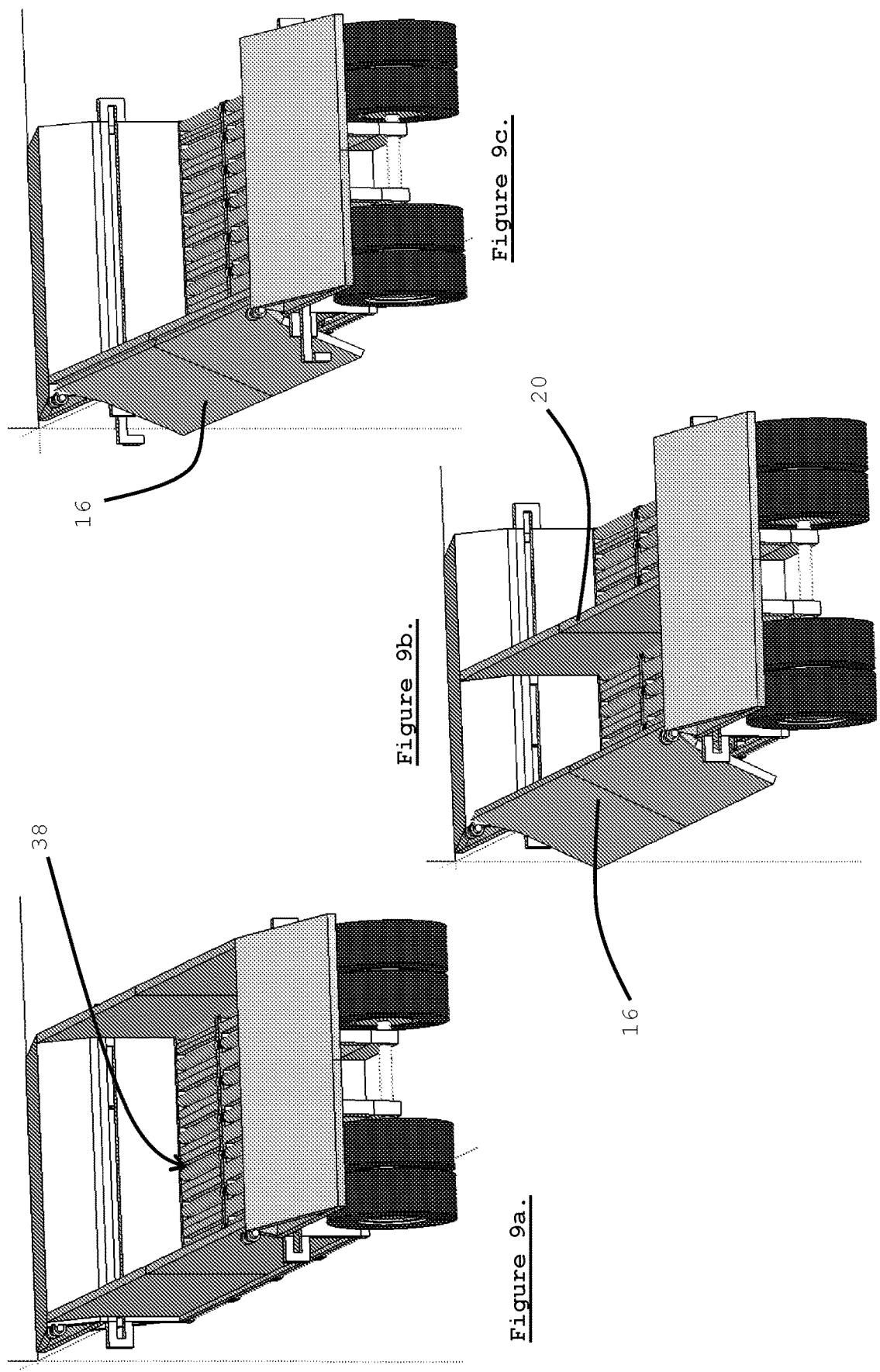

PARTICULATE MATERIAL HAULAGE ARRANGEMENT

TECHNICAL FIELD

This invention relates to a particulate material haulage arrangement, a haulage truck for particulate material, and an associated method for hauling particulate material.

BACKGROUND ART

The following discussion of the background art is intended to facilitate an understanding of the present invention only. The discussion is not an acknowledgement or admission that any of the material referred to is or was part of the common general knowledge as at the priority date of the application.

Transport of particulate material is known in the art. Various arrangements are known whereby particulate material is loaded and unloaded from carriers or similar haulage arrangements. A typical example includes dump trucks having trays and/or trailer arrangements for transporting particulate material. Material is typically loaded into a dump truck by means of a front-end loader, excavator or a suitable hopper or loading silo, and then transported to a desired location, where the tray is tilted so that the material slides out of the tray under the influence of gravity.

There are shortcomings in the prior art, as berm contact of tipping trays can result in damage to the tray, and the ejection of material from the tray is not sufficiently controllable. In addition, particulate material may adhere to the tray, resulting in so-called 'carry-back', where adhesion and/or cohesion between the material particles and the tray results in material that remains in the tray. Such carry-back wastes tray volume as material is carried back and forth and often requires manual removal, adding time, cost and risk to haulage operations.

In response to some of these shortcomings, there have been developments in the art. For example, U.S. Pat. No. 6,837,668 relates to a load carrying body for a vehicle, in particular for the purpose of facilitating the unloading of material. The body includes a floor constituted by a flexible belt resting on the upper surface of a loadbearing base, and has one end connected to a headboard and the other end connected to a winch. A cable has one end connected to the headboard and the other end connected to the winch. A guide system for the cable includes a compensating mechanism which varies the path of the cable during rotation of the winch, so as to compensate for a difference between the belt diameter and the cable diameter on the winch, the difference varying as the belt is wound and unwound.

These known systems are prone to malfunction due to complexity, do not sufficiently address carry-back and are generally unable to cater for different types of particulate material, in particular heavier loads such as iron ore, or the like.

The present invention seeks to propose possible solutions, at least in part, in amelioration of the known shortcomings in the art.

SUMMARY OF THE INVENTION

The skilled addressee will appreciate that reference in this specification to 'particulate material' generally includes reference to any material or aggregate of material comprising a plurality of separate or distinct particles, such as sand, ore, clay, gravel, grain, etc., including or excluding moisture content, e.g. clay.

According to a first aspect of the invention there is provided a particulate material haulage arrangement comprising:

a frame configured for operative attachment to a suitable tractor, and defining a tray for operatively receiving particulate material therein, said tray comprising two side walls separated by a lower section with a headwall at a head end of the tray and slidably arranged in-between the side walls;

an urger at the head end configured to operatively urge the headwall to slide across the lower section;

a foldable floor slidably arranged on the lower section and fast at a first end with the headwall; and a retractor arranged at an ejection end of the tray and configured to continuously retract a second end of the foldable floor underneath the lower section whilst the headwall is urged, said retractor configured to agitate the floor during retraction to counteract adhesion of particulate material ejected from the tray.

Typically, the foldable floor comprises an elastically flexible mat.

Alternatively, or additionally, the foldable floor comprises a slatted floor comprised of a plurality of slats to facilitate operative folding when retracted.

Typically, the suitable tractor is selected from a group comprising a truck, a locomotive and a marine vessel.

In one example, the lower section of the tray is slanted toward the head end.

In such an example, the frame includes guides configured to guide the headwall along the side walls, as well as upwards in-between the side walls, as the headwall slides along towards a shallower ejection end of the tray.

In another example, where the lower section is substantially horizontal, the frame includes guides configured to guide the headwall along the side walls as the headwall slides along towards the ejection end of the tray.

Typically, the lower section of the frame comprises a framework configured to support the floor.

In a further embodiment, the floor is substantially suspended between the side walls and above the frame to minimise impact damage to the floor from incoming particulate material.

Typically, the urger comprises a linear actuator, such as a hydraulic or pneumatic cylinder, a worm drive, a rack and pinion arrangement, or the like.

Typically, the floor comprises a rubber belt or mat sized, shaped and dimensioned to fit in-between the side walls and span from the head end to the ejection end of the tray.

In one example, the lower section of the frame is configured to reduce dynamic friction of the floor sliding across said lower section.

In one example, the lower section of the frame comprises rollers or guides to facilitate sliding of the floor across said lower section.

In another example, the lower section of the frame comprises composite or low-friction materials to reduce dynamic friction.

Typically, the retractor comprises a spool at the ejection end and underneath the lower section onto which the floor is wound during retraction.

In particular, the spool is configured to agitate the floor by having a particular cross-sectional profile.

Preferably, the spool comprises a cross-sectional profile of a Reuleaux triangle.

It is to be appreciated by the skilled addressee that a Reuleaux triangle is a shape formed from the intersection of three circular disks, each having its centre on the boundary of the other two, so that its boundary is a curve of constant width.

In an embodiment, the spool includes an internal gear arrangement to facilitate in agitating and spooling of the floor when retracted.

Typically, the retractor is biased via a suitable biasing means, such as a spring, to exert a continuous retraction force on the floor.

Alternatively, the retractor is linked to the urger so that operation of the urger produces a corresponding retraction force on the floor.

According to a second aspect of the invention there is provided a haulage truck for particulate material, said truck comprising:

a tray for operatively receiving particulate material therein, said tray comprising two side walls separated by a lower section with a headwall at a head end of the tray and slidably arranged in-between the side walls;

an urger at the head end configured to operatively urge the headwall to slide across the lower section;

a foldable floor slidably arranged on the lower section and fast at a first end with the headwall; and a retractor arranged at an ejection end of the tray and configured to continuously retract a second end of the floor underneath the lower section whilst the headwall is urged, said retractor configured to agitate the floor during retraction to counteract adhesion of particulate material ejected from the tray.

Typically, the foldable floor comprises an elastically flexible mat.

Alternatively, or additionally, the foldable floor comprises a slatted floor comprised of a plurality of slats to facilitate operative folding when retracted.

In one example, the lower section of the tray is slanted toward the head end.

In such an example, the frame includes guides configured to guide the headwall along the side walls, as well as upwards in-between the side walls, as the headwall slides along towards a shallower ejection end of the tray.

In another example, where the lower section is substantially horizontal, the frame includes guides configured to guide the headwall along the side walls as the headwall slides along towards the ejection end of the tray.

Typically, the lower section of the frame comprises a framework configured to support the floor.

In a further embodiment, the floor is substantially suspended between the side walls and above the frame to minimise impact damage to the floor from incoming particulate material.

Typically, the urger comprises a linear actuator, such as a hydraulic or pneumatic cylinder, a worm drive, a rack and pinion arrangement, or the like.

Typically, the floor comprises a rubber belt sized, shaped and dimensioned to fit in-between the side walls and span from the head end to the ejection end of the tray.

In one example, the lower section of the frame is configured to reduce dynamic friction of the floor sliding across said lower section.

In one example, the lower section of the frame comprises rollers to facilitate sliding of the floor across said lower section.

In another example, the lower section of the frame comprises composite or low-friction materials to reduce dynamic friction.

Typically, the retractor comprises a spool at the ejection end and underneath the lower section onto which the floor is wound during retraction.

In particular, the spool is configured to agitate the floor by having a particular cross-sectional profile.

Preferably, the spool comprises a cross-sectional profile of a Reuleaux triangle.

In an embodiment, the spool includes an internal gear arrangement to facilitate in agitating and spooling of the floor when retracted.

Typically, the retractor is biased via a suitable biasing means, such as a spring, to exert a continuous retraction force on the floor.

Alternatively, the retractor is linked to the urger so that operation of the urger produces a corresponding retraction force on the floor.

According to a third aspect of the invention there is provided a method for hauling particulate material with a particulate material haulage arrangement in accordance with the first aspect of the invention, said method comprising the steps of:

loading particulate material into the tray;

transporting the frame to a desired location via a suitable tractor; and activating the urger to urge the headwall from the head end of the tray towards the ejection end, so that the second end of the floor is retracted onto the retractor and the particulate material is ejected from the ejection end, said retractor agitating the floor during retraction to counteract adhesion of particulate material ejected from the tray.

BRIEF DESCRIPTION OF THE DRAWINGS

The description will be made with reference to the accompanying drawings in which:

FIGS. 9a to 9c are diagrammatic perspective view representations of a further embodiment of a particulate material haulage arrangement;

DETAILED DESCRIPTION OF EMBODIMENTS

Figure 1:
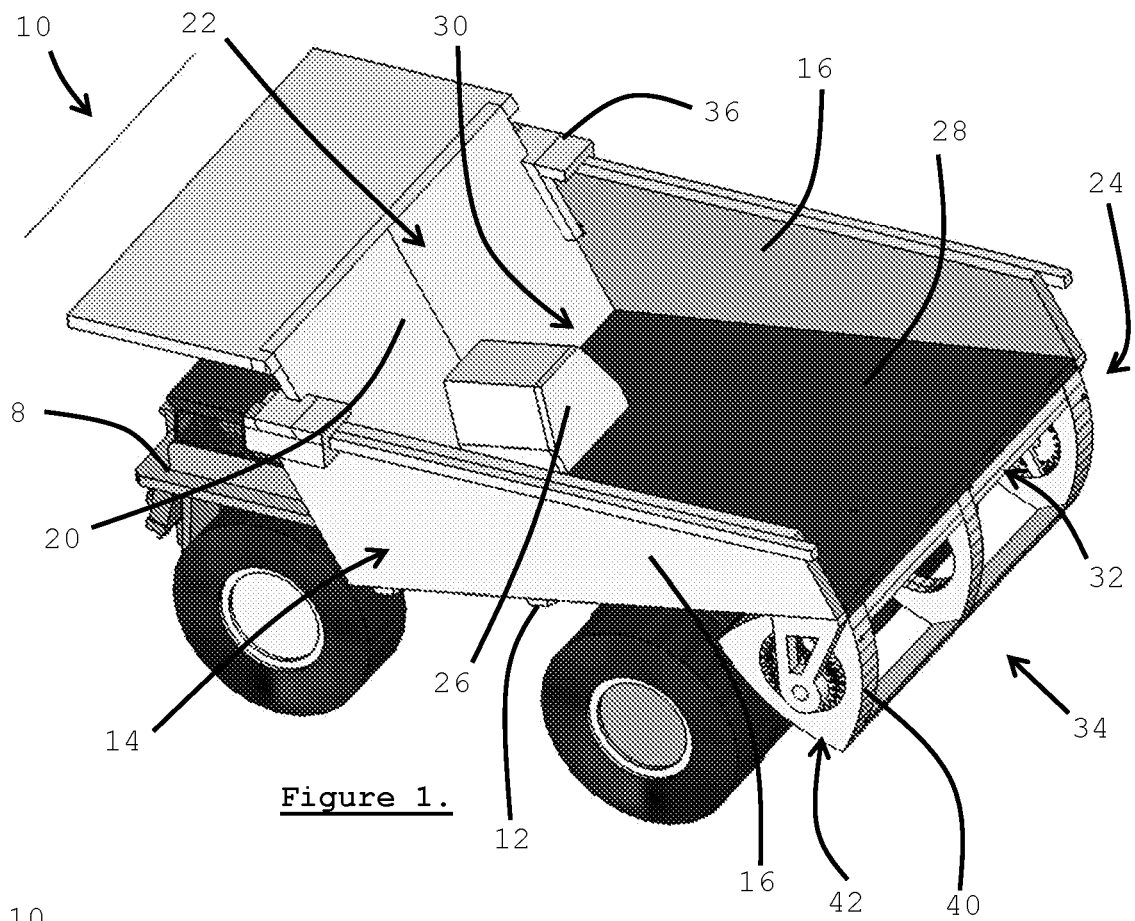
FIG. 1 is a diagrammatic perspective view representation of one embodiment of a particulate material haulage arrangement in accordance with one aspect of the invention.
Figure 2:
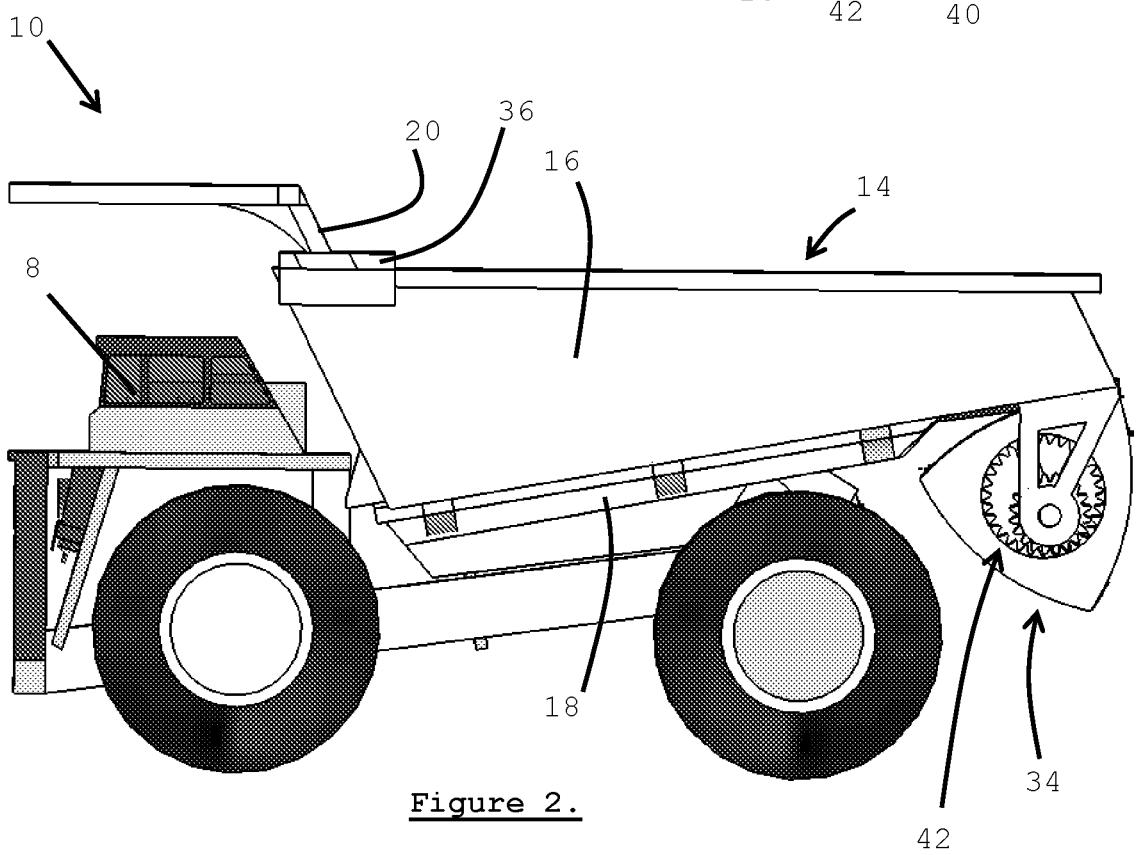
FIG. 2 is a diagrammatic side view representation of the particulate material haulage arrangement of FIG. 1.
Figure 3:
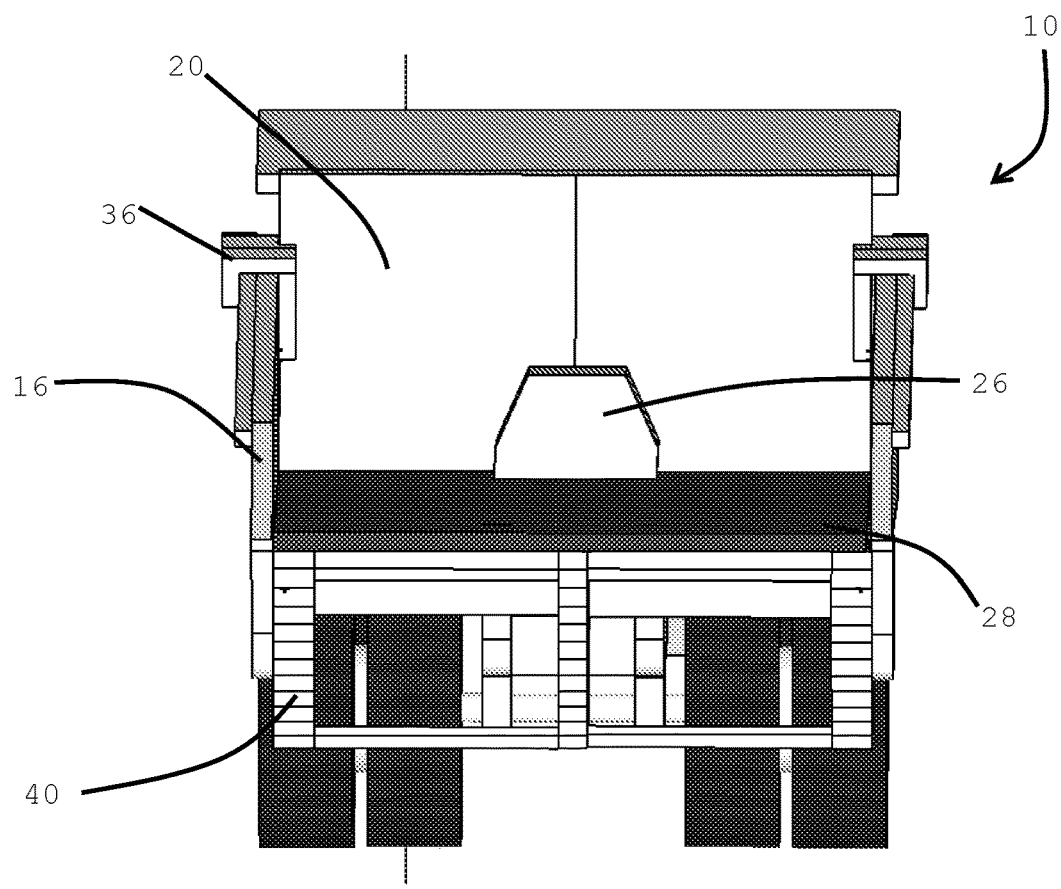
FIG. 3 is a diagrammatic rear-view representation of the particulate material haulage arrangement of FIG. 1.
Figure 4:
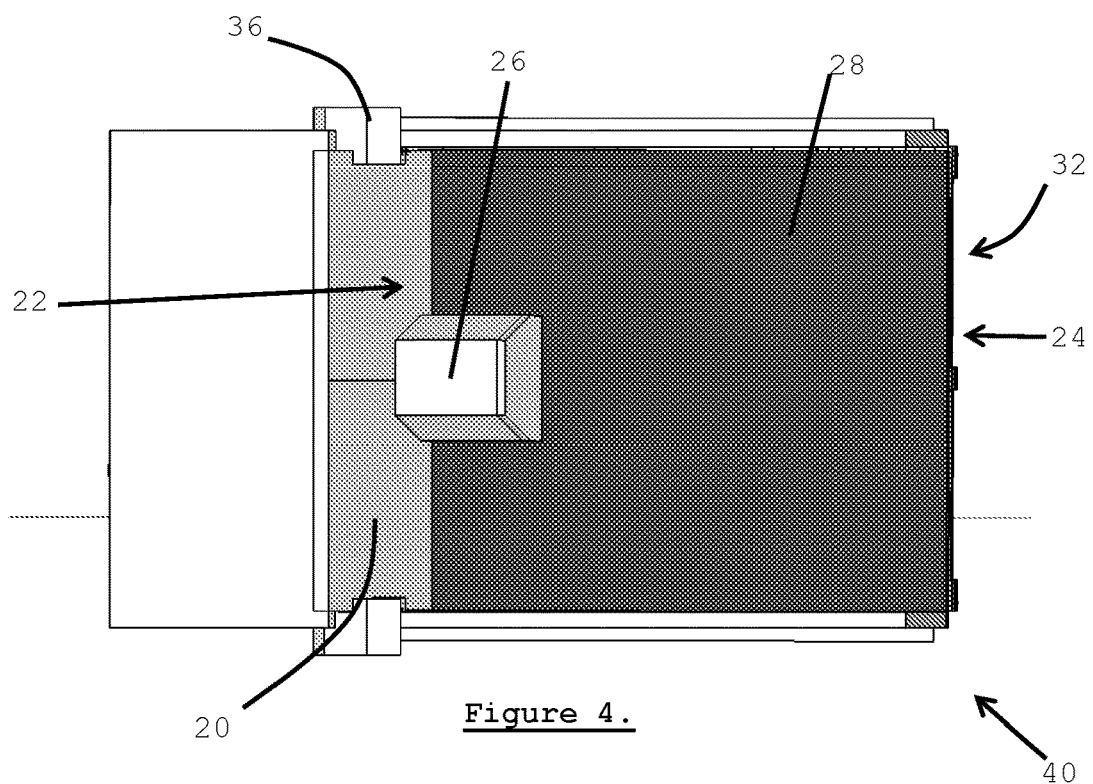
FIG. 4 is a diagrammatic top view representation of the particulate material haulage arrangement of FIG. 1.
Figure 5:
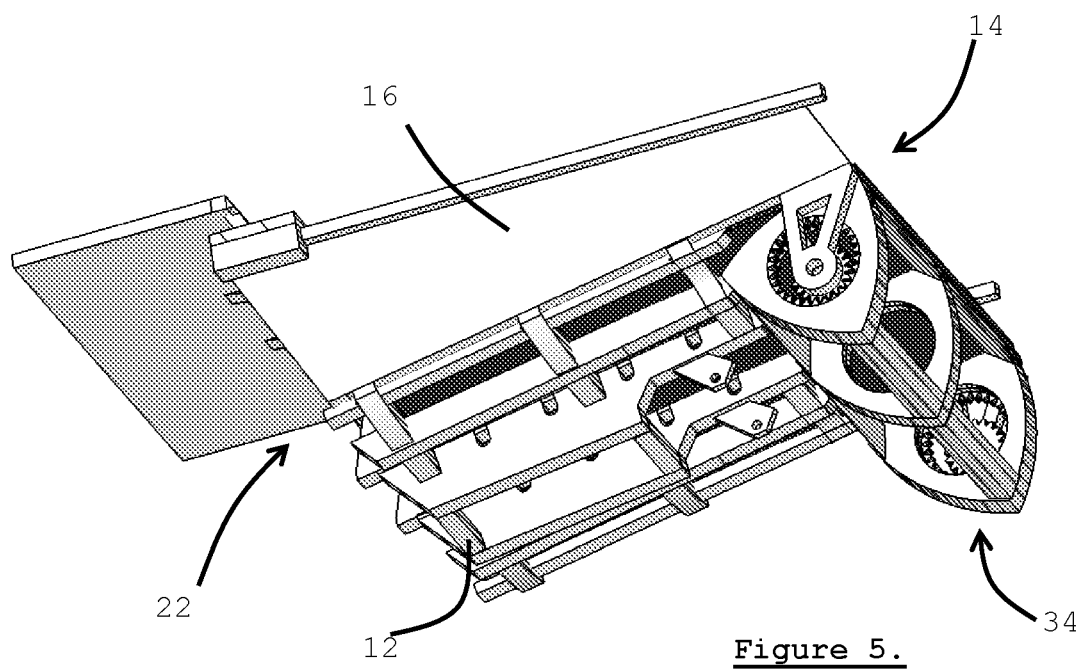
FIG. 5 is a diagrammatic perspective bottom-view representation of the particulate material haulage arrangement of FIG. 1.
Figure 6:
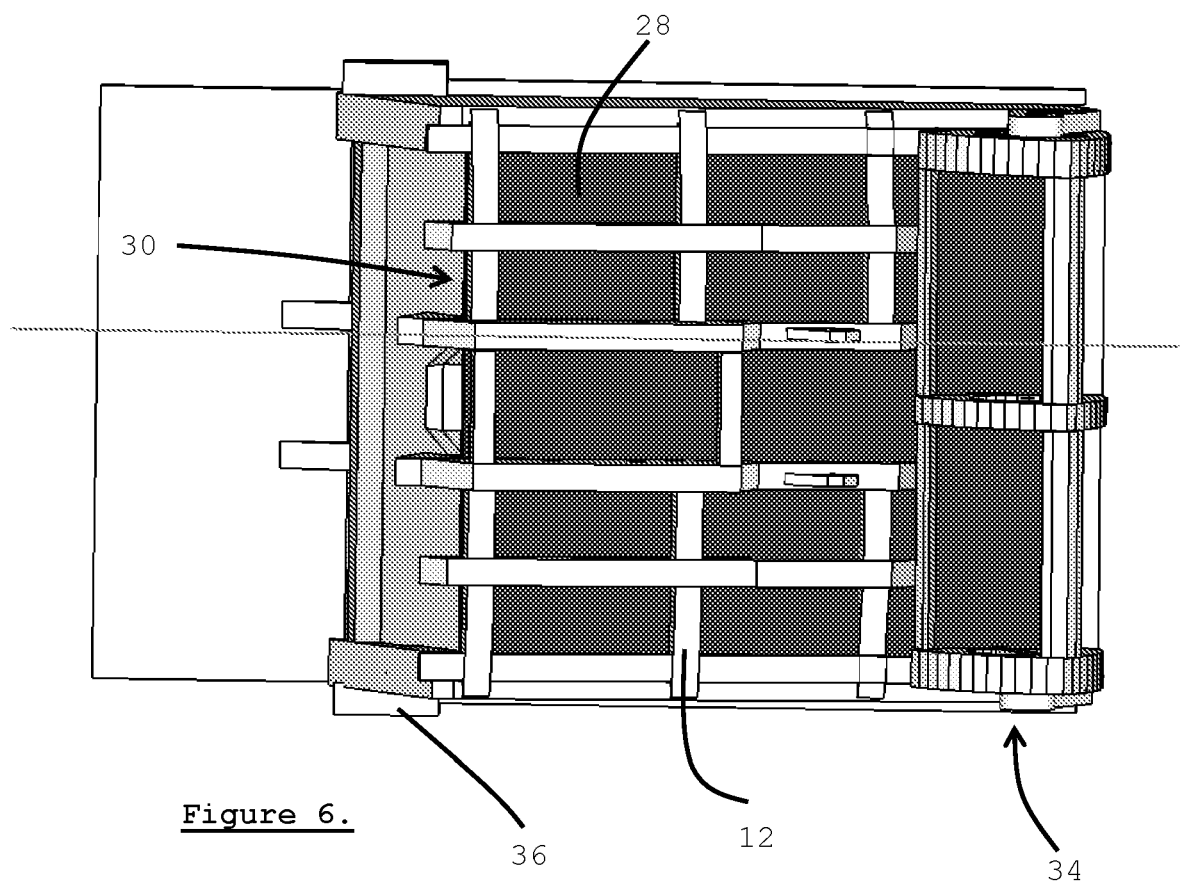
FIG. 6 is a diagrammatic bottom view representation of the particulate material haulage arrangement of FIG. 1.
Figure 7A:
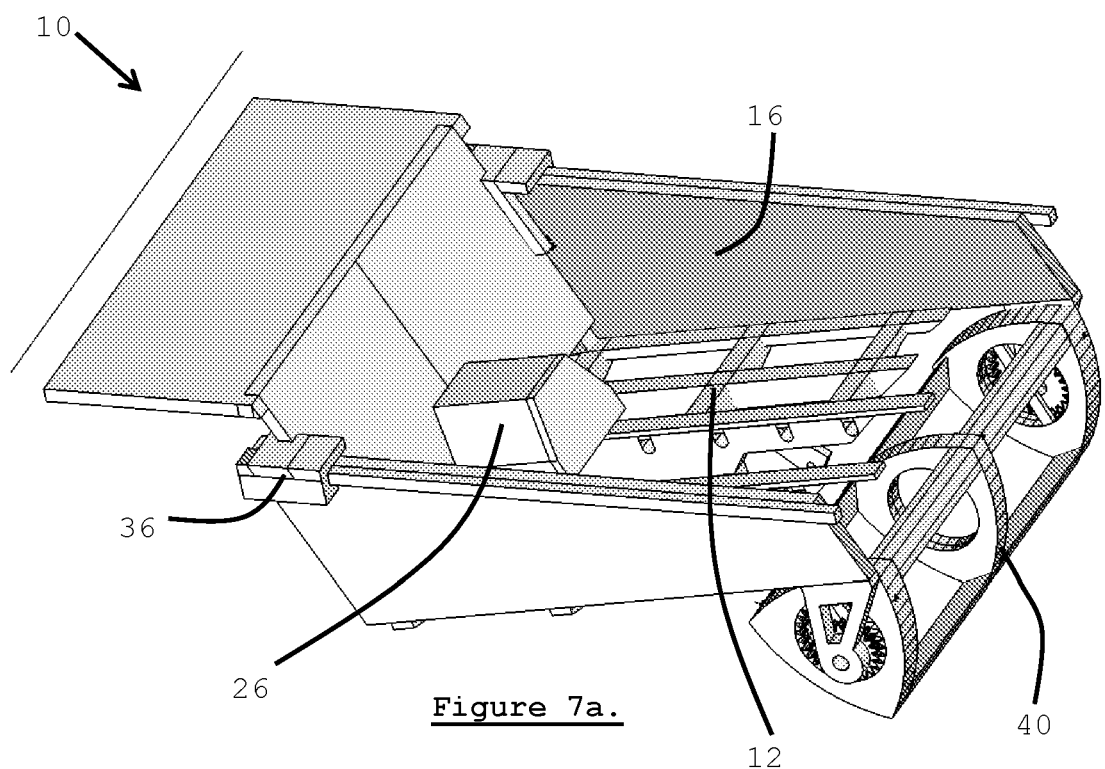
FIGS. 7a and 7b are diagrammatic perspective view representations of the particulate material haulage arrangement of FIG. 1.
Figure 7B:
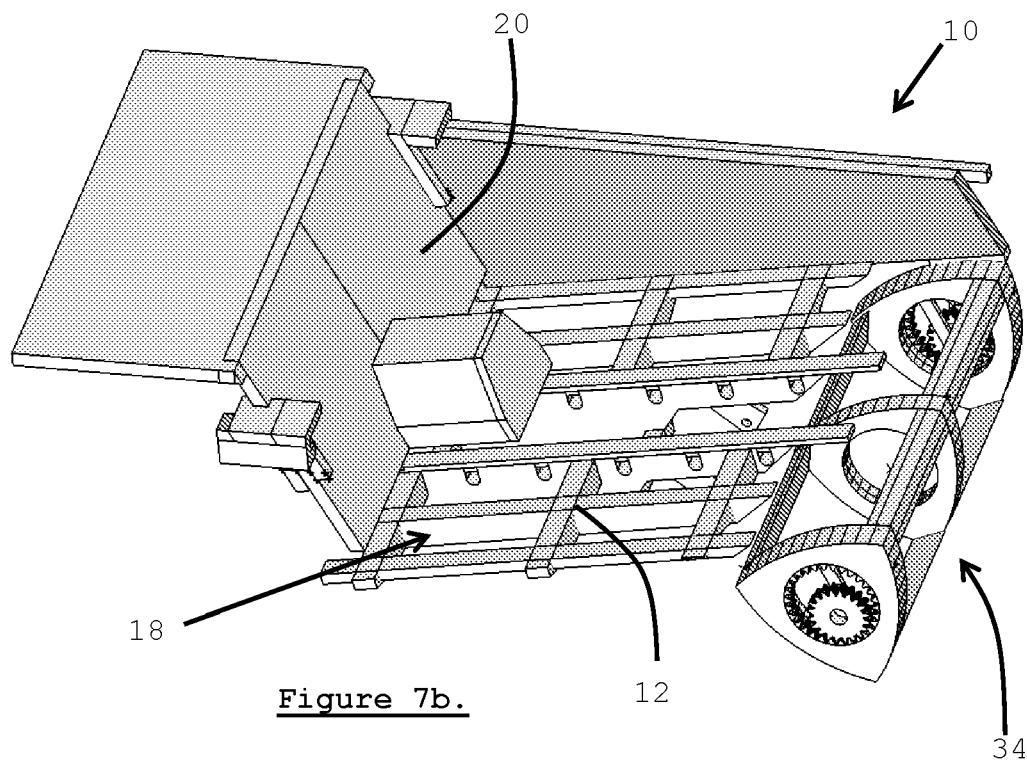
Figure 8A:
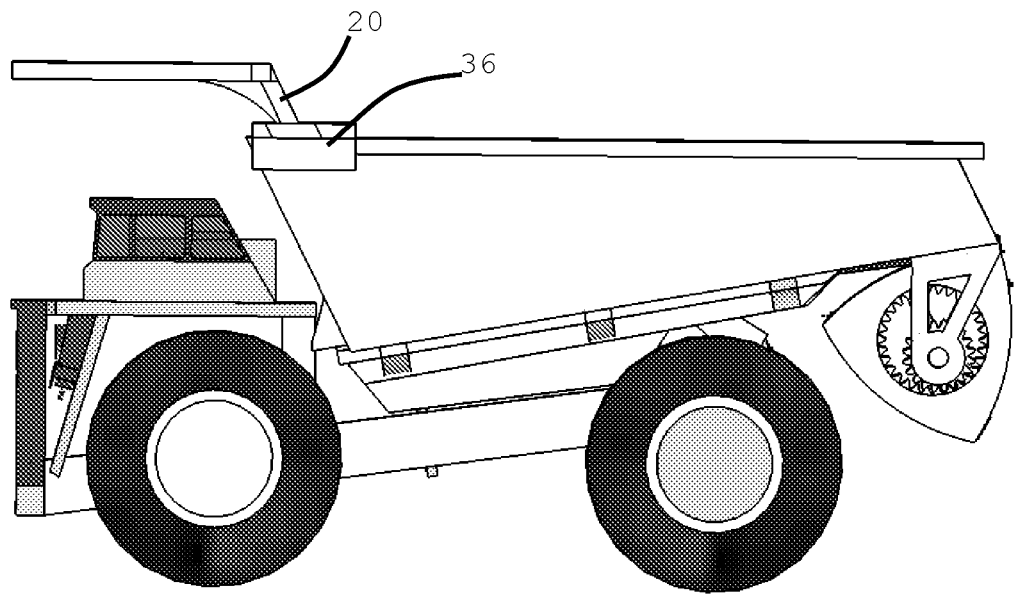
FIGS. 8a to 8d are diagrammatic side view representations of the particulate material haulage arrangement of FIG. 1 showing various stages of unloading.
Figure 8B:
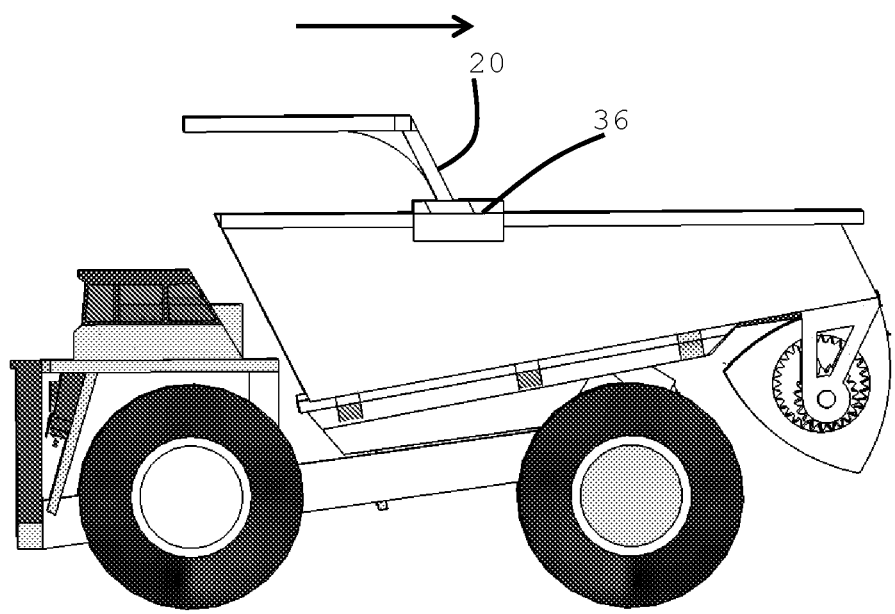
Figure 8C:
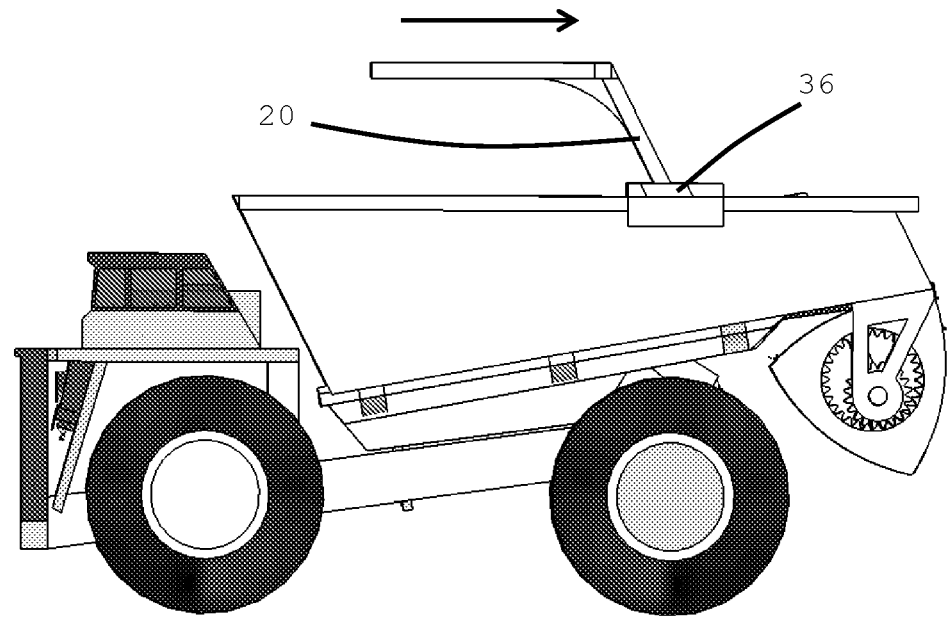
Figure 8D:
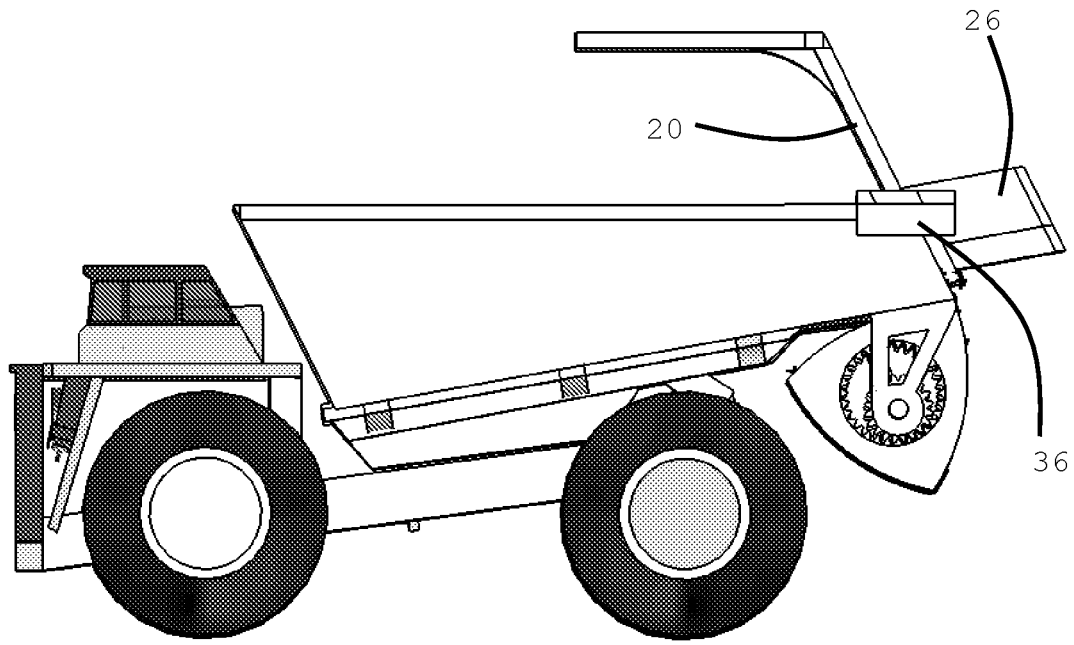

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above. In the figures, incorporated to illustrate features of the example embodiment or embodiments, like reference numerals are used to identify like parts throughout.

With reference now to the accompanying Figures, there is shown one possible example of a particulate material haulage arrangement 10. In this embodiment, the haulage arrangement 10 generally comprises a frame 12 configured for operative attachment to a suitable tractor 8, such as a haulage truck typically used in mining, albeit manned or automated. However, other tractors are apposite and may include tractors, trucks, locomotives, marine vessels, etc. For example, suitable frames 12 can be configured for use on trains, as barges, etc. Such variations, although not described in detail herein, are expressly included in the scope of the invention.

The frame 12 of the haulage arrangement 10 generally defines a tray 14 for operatively receiving particulate material (not shown) therein. The tray 14 comprises two side walls 16 separated by a loadbearing lower section 18 with a headwall 20 at a head end 22 of the tray 14. The headwall 20 is slidably arranged in-between the side walls 16. Commonly, the lower section 18 of the frame 12 comprises a framework configured to support the floor 28, but other arrangements are possible and within the scope of the present invention.

Haulage arrangement 10 further includes an urger 26 at the head end 22 configured to operatively urge the headwall 20 to slide across the lower section 18. The urger 26 typically comprises a linear actuator, such as a hydraulic or pneumatic cylinder, as is often used for trucks and heavy machinery. As will be appreciated by the skilled addressee, other types of actuators are possible, such as a worm drive, a rack and pinion arrangement, and are within the scope of the present invention.

In the current example, the lower section 18 of the tray 14 is slanted toward the head end 22, as shown. In this example, the frame 12 includes guides 36 that are configured to guide the headwall 20 along the side walls 16, as well as upwards in-between the side walls 16, as the headwall 20 slides along towards the shallower ejection end 24 of the tray 14. This action of simultaneously guiding along the side walls 16 and upwards is clearly illustrated in FIGS. 8a to 8d. In another example, where the lower section 18 is substantially flat or horizontal, obviating upward guidance of the headwall 20, the frame 12 only includes guides 36 configured to guide the headwall 20 along the side walls 16 as the headwall 20 slides along towards the ejection end 24 of the tray 14.

Figure 10A:
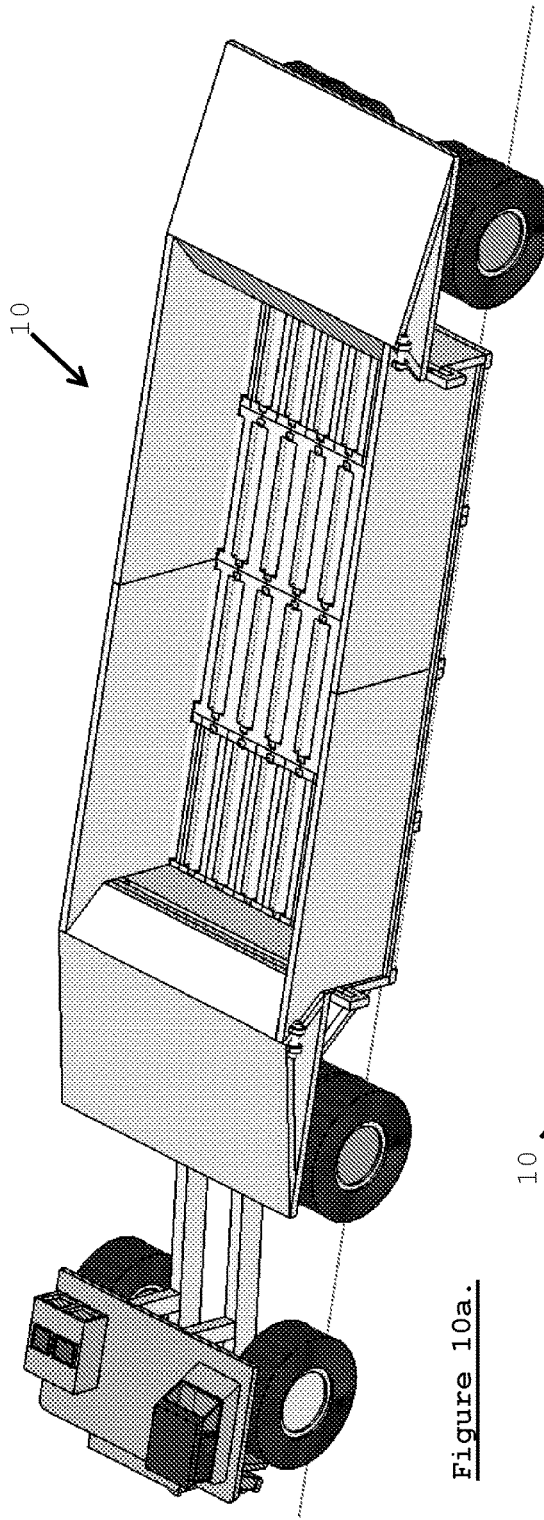
FIGS. 10a and 10b are diagrammatic perspective view representation of a yet further embodiment of a particulate material haulage arrangement.
Figure 10B:
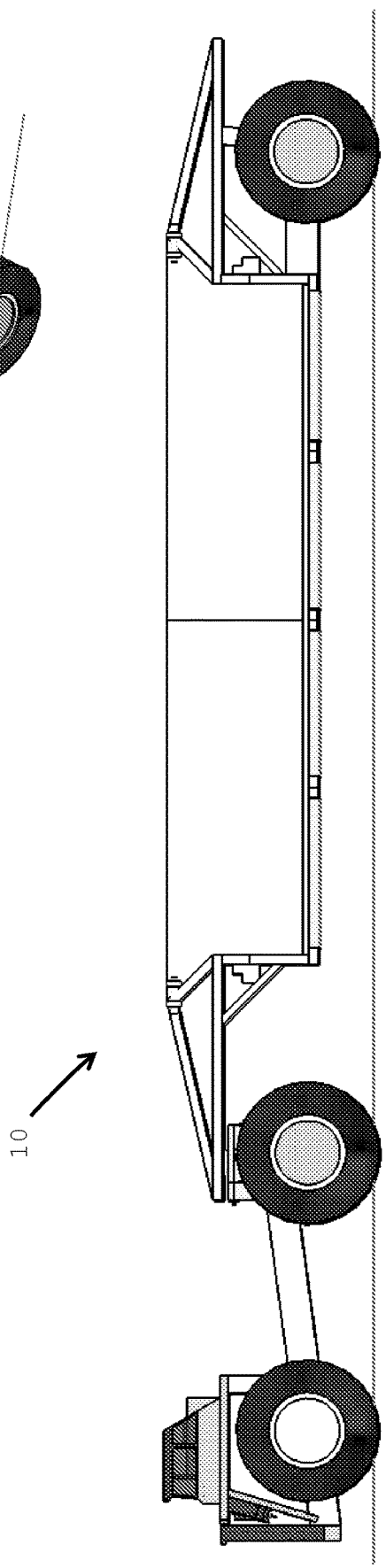

Haulage arrangement 10 also includes a foldable floor 28, such as an elastically flexible rubber floor, or a slatted floor (described in more detail below) slidably arranged on the lower section 18 and fast at a first end 30 thereof with the headwall 20. Typically, the floor 28 comprises a rubber mat or belt or similar material which is sized, shaped and dimensioned to fit in-between the side walls 16 and span from the head end 22 to the ejection end 24 of the tray 14. The lower section 18 of the frame 12 is typically configured to reduce dynamic friction of the floor 28 sliding across the lower section 18. In the examples of FIGS. 9 and 10, the lower section 18 of the frame 12 comprises rollers 38 to facilitate sliding of the floor 28 across the lower section 18, when in use. In other examples, the lower section 18 of the frame 12 comprises composite or low-friction materials to reduce dynamic friction, as is well-known in the art.

Figure 13:
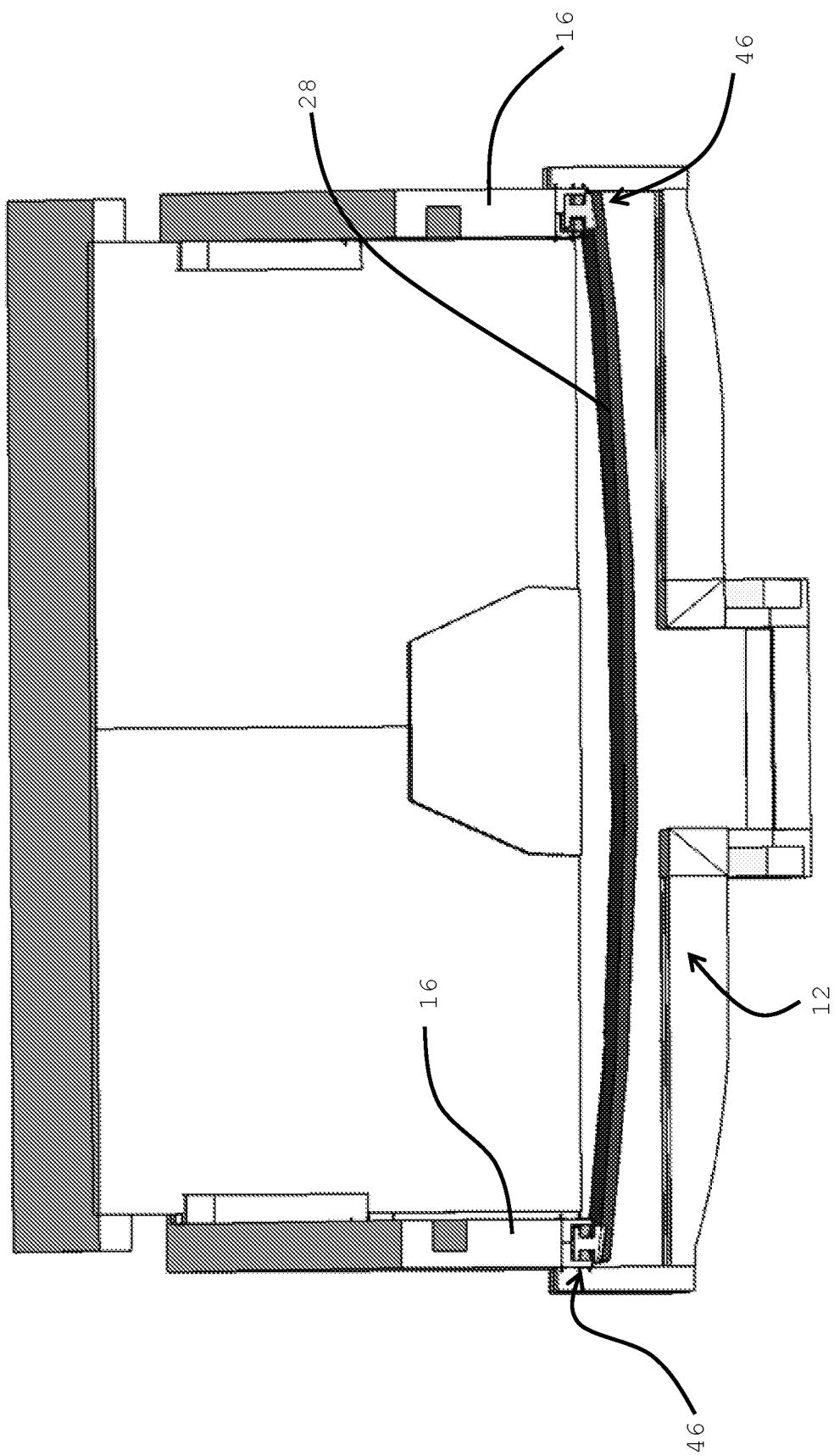
FIG. 13 is a diagrammatic perspective view representation of a further embodiment of a particulate material haulage arrangement.

The skilled addressee is further to appreciate that, in a further embodiment shown in FIG. 13, the floor 28 may be suspended between the side walls 16 and substantially above the lower section 18. In such an example, the lower section 18 of the frame 12 may be configured to slidably suspend the floor 28 between the side walls and substantially above said frame to minimise impact damage to the floor 28 from incoming particulate material. For example, such a suspended floor arrangement typically facilitates applications where the particulate material comprises sharp rocks, or the like. In such applications with sharp rocks, the floor, e.g. a rubber mat, etc., resting on the load bearing frame 12 can be pierced easily. To address this issue, a suspended (hammock-like) flexible floor 28 is used, as shown, which muffles the force of falling rocks. To secure the floor 28 to the tray 14 and enable it to slide to the ejection end 24, the exemplified embodiment employs guides 46 operatively sliding along the lower edge of the side walls 16, as shown, although other arrangements are also possible.

Haulage arrangement 10 further incorporates a retractor 34 arranged at the ejection end 24 of the tray 14 and is configured to continuously retract a second end 32 of the floor 28 underneath the lower section 18 whilst the headwall 20 is urged. Importantly, the retractor 34 is further configured to agitate the floor 28 during retraction to counteract adhesion of particulate material ejected from the tray 14.

In the present example, the retractor 34 comprises a spool 40 at the ejection end 24, positioned underneath the lower section 18, and onto which the floor 28 is wound during retraction. Alternatively, the floor 28 can also be wound over the spool and underneath the lower section 18, such as a conveyor belt-type arrangement where the floor passes underneath the tray when retracted, or the like. In particular, the spool 40 is configured to agitate the floor 28 during retraction by having a particular cross-sectional profile, i.e. as the spool 40 rotates to wind the floor up onto or over the spool 40, it agitates the floor 28. The spool 40 typically includes an internal gear arrangement 42 to facilitate in agitating and spooling of the floor when retracted.

In a preferred embodiment, the spool 40 comprises a cross-sectional profile of a Reuleaux triangle, as shown. It is to be appreciated by the skilled addressee that a Reuleaux triangle is a shape formed from the intersection of three circular disks, each having its centre on the boundary of the other two, so that its boundary is a curve of constant width. Accordingly, as the spool 40 rotates in retracting the floor 28, the Reuleaux triangle cross section agitates the floor 28 to loosen particulate material which may be adhering thereto. Other configurations are possible and within the scope of the present invention.

Typically, the retractor 34 is biased via a suitable biasing means, such as a spring, an hydraulic, pneumatic or electromechanical motor, or the like, to exert a continuous retraction force on the floor 28. Alternatively, or additionally, the retractor 34 is linked to the urger 26 so that operation of the urger 26 produces a corresponding retraction force on the floor 28, i.e. part of a pneumatic or hydraulic circuit, an electromechanical link, or the like. For example, internal gear arrangement 42 may be biased or linked to the urger 26 to spool the foldable floor 28 as it is retracted, or the like.

As shown in FIGS. 9 and 10, different configurations of the haulage arrangement 10 are possible. For example, the head wall may be urged transversely to a direction of travel of the tractor 8, i.e. the ejection end 24 may be at the side of the arrangement when compared to earlier embodiments described herein. Similarly, in a 'wheelbarrow' configuration, the ejection end 24 may be in a direction of travel of a suitable tractor 8, where the head end is then positioned distal from said direction of travel, i.e. at the 'rear' of the tractor 8.

The skilled addressee will further appreciate that the present invention extends towards an associated method for hauling particulate material with the haulage arrangement 10. Such a method generally comprises the steps of loading particulate material into the tray 14; transporting the frame 12 to a desired location via a suitable tractor 8; and activating the urger 26 to urge the headwall 20 from the head end 22 of the tray 12 towards the ejection end 24, so that the second end 32 of the floor 28 is retracted into the retractor 34 and the particulate material is ejected from the ejection end 24. During this, the retractor 34 agitates the floor 28 during retraction to counteract adhesion of particulate material ejected from the tray 14.

Figure 11A:
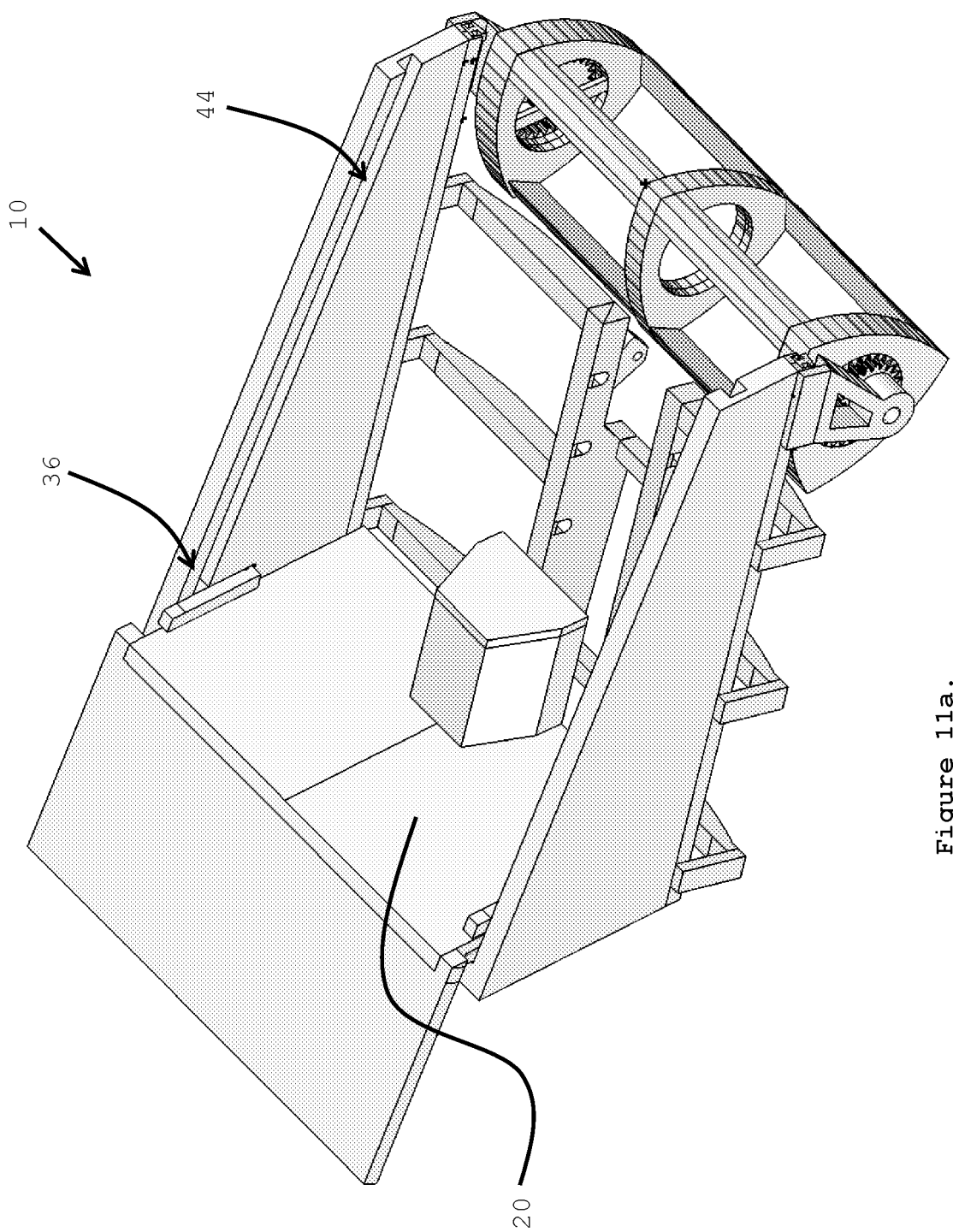
FIGS. 11a and 11b are diagrammatic perspective view representations of a further embodiment of the particulate material haulage arrangement.
Figure 11B:
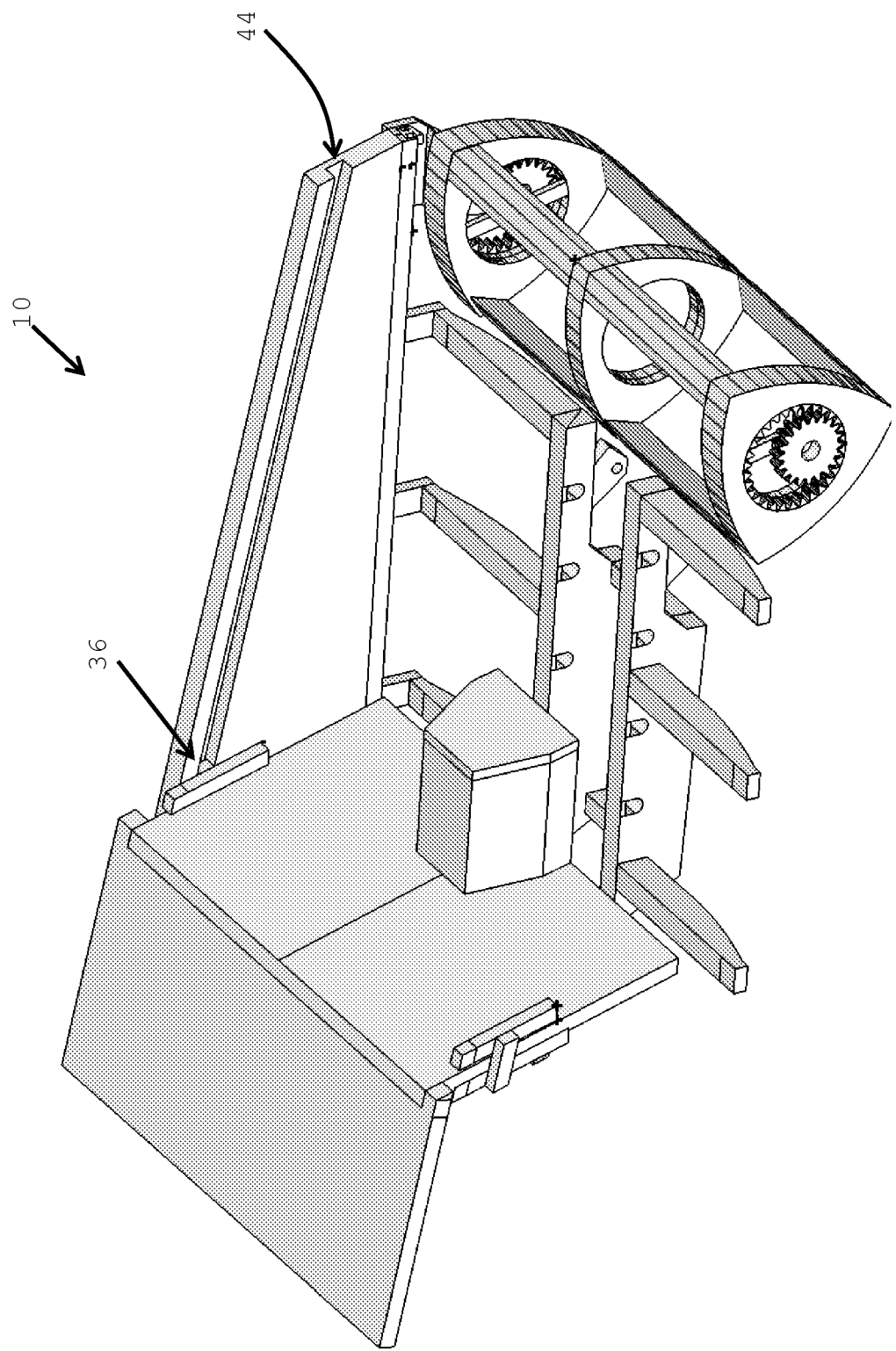

With reference now to FIG. 11 of the accompanying drawings, there is shown a further embodiment of the haulage arrangement 10, featuring a different example of the guides 36 for guiding headwall 20 along the side walls 16. Such an embodiment is useful where damage to an upper part of the side walls 16 may occur, and includes guide channels 44 in the side walls 16 wherein the guides 36 run to guide the headwall 20, as shown.

Figure 12:
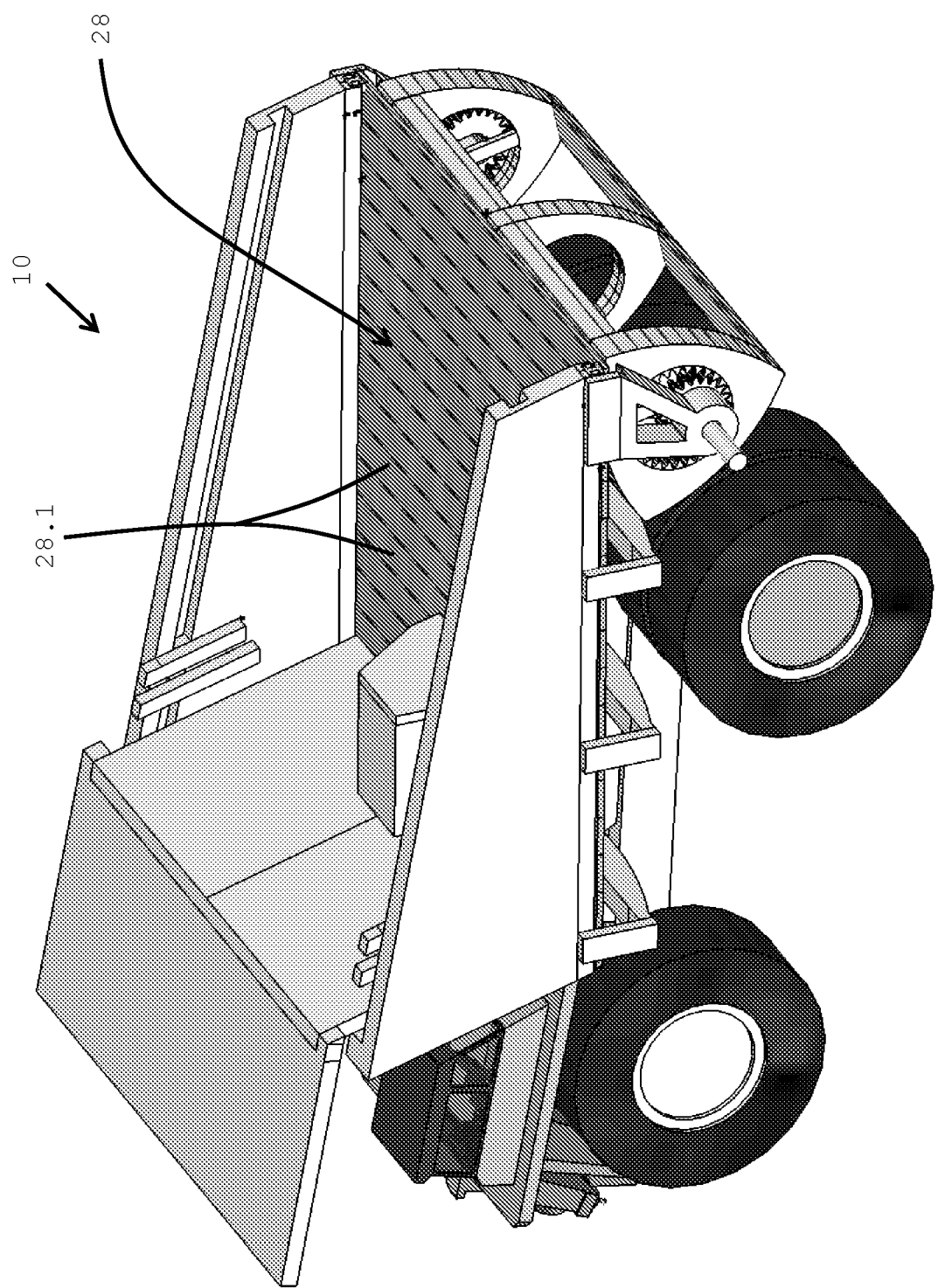
FIG. 12 is a diagrammatic perspective view representation of the embodiment of the particulate material haulage arrangement of FIG. 11.

In addition, FIG. 12 exemplifies an embodiment of the arrangement 10 which features the foldable floor comprising a slatted floor 28 comprised of a plurality of slats 28.1 to facilitate operative folding when retracted. Such slats 21.1 may be manufactured from a polymer material, a rubber, a metal, or the like.

Applicant believes it particularly advantageous that the present invention provides for a particulate haulage arrangement 10 able to accommodate impact and abrasive wear from loading and unloading of particulate material from the tray 14 due to the use of the elastically flexible floor 28. In addition, it is considered particularly advantageous that unloading of the tray produces negligible abrasive wear, as there is no abrasion on the floor 28 as the particulate material is ejected. Importantly, the retractor 34 also agitates the floor 28 during ejection, so that particulate material does not adhere thereto.

Applicant also believes it particularly advantageous that the unique Reuleaux triangle profile of the retractor provides increased ground clearance as opposed to a circular retractor, and also minimises potential berm contact damage to the tray, as often occurs at mining and construction sites.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

It is to be appreciated that reference to "one example" or "an example" of the invention, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

Any method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A particulate material haulage arrangement comprising:
   a frame configured for operative attachment to a suitable tractor, and defining a tray for operatively receiving particulate material therein, said tray comprising two side walls separated by a loadbearing lower section with a headwall at a head end of the tray and slidably arranged in-between the side walls;
   an urger at the head end configured to operatively urge the headwall to slide across the lower section;
   a foldable floor slidably arranged on the lower section and fast at a first end with the headwall; and
   a retractor arranged at an ejection end of the tray and configured to continuously retract a second end of the foldable floor underneath the lower section whilst the headwall is urged, wherein the retractor comprises a spool at the ejection end and underneath the lower section onto which the floor is wound during retraction, said spool configured to agitate the floor by having a particular cross-sectional profile of a Reuleaux triangle, the spool including an internal gear arrangement to facilitate in agitating and spooling of the floor during retraction to counteract adhesion of particulate material ejected from the tray.

2. The arrangement of claim 1, wherein the foldable floor comprises an elastically flexible mat or a slatted floor comprised of a plurality of slats to facilitate operative folding when retracted.

3. The arrangement of claim 1, wherein the lower section of the tray is slanted toward the head end and the frame includes guides configured to guide the headwall along the side walls, as well as upwards in-between the side walls, as the headwall slides along towards a shallower ejection end of the tray.

4. The arrangement of claim 1, wherein the lower section of the tray is substantially horizontal and the frame includes guides configured to guide the headwall along the side walls as the headwall slides along towards the ejection end of the tray.

5. The arrangement of claim 1, wherein the lower section of the frame comprises a framework configured to support the floor, or the floor is substantially suspended between the side walls and above the frame, to minimise impact damage to the floor from incoming particulate material.

6. The arrangement of claim 1, wherein the floor comprises a rubber belt or mat sized, shaped and dimensioned to fit in-between the side walls and span from the head end to the ejection end of the tray.

7. The arrangement of claim 1, wherein the lower section of the frame is configured to reduce dynamic friction of the floor sliding across said lower section by comprising rollers or guides to facilitate sliding of the floor across said lower section or via the lower section of the frame comprising composite or low-friction materials.

8. The arrangement of claim 1, wherein the retractor is biased via a suitable biasing means, such as a spring, to exert a continuous retraction force on the floor.

9. The arrangement of claim 1, wherein the retractor is linked to the urger so that operation of the urger produces a corresponding retraction force on the floor.

10. A haulage truck for particulate material, said truck comprising:
    a tray for operatively receiving particulate material therein, said tray comprising two side walls separated by a loadbearing lower section with a headwall at a head end of the tray and slidably arranged in-between the side walls;
    an urger at the head end configured to operatively urge the headwall to slide across the lower section;
    a foldable floor slidably arranged on the lower section and fast at a first end with the headwall; and
    a retractor arranged at an ejection end of the tray and configured to continuously retract a second end of the floor underneath the lower section whilst the headwall is urged, wherein the retractor comprises a spool at the ejection end and underneath the lower section onto which the floor is wound during retraction, said spool configured to agitate the floor by having a particular cross-sectional profile of a Reuleaux triangle, the spool including an internal gear arrangement to facilitate in agitating and spooling of the floor during retraction to counteract adhesion of particulate material ejected from the tray.

11. The truck of claim 10, wherein the foldable floor comprises an elastically flexible mat or a slatted floor comprised of a plurality of slats to facilitate operative folding when retracted.

12. The truck of claim 10, wherein the lower section of the tray is slanted toward the head end and the frame includes guides configured to guide the headwall along the side walls, as well as upwards in-between the side walls, as the headwall slides along towards a shallower ejection end of the tray.

13. The truck of claim 10, wherein the lower section of the tray is substantially horizontal and the frame includes guides configured to guide the headwall along the side walls as the headwall slides along towards the ejection end of the tray.

14. The truck of claim 10, wherein the lower section of the frame comprises a framework configured to support the floor, or the floor is substantially suspended between the side walls and above the frame, to minimise impact damage to the floor from incoming particulate material.

15. The truck of claim 10, wherein the urger comprises a linear actuator.

16. The truck of claim 10, wherein the floor comprises a rubber mat or belt sized, shaped and dimensioned to fit in-between the side walls and span from the head end to the ejection end of the tray.

17. The truck of claim 10, wherein the lower section of the frame is configured to reduce dynamic friction of the floor sliding across said lower section by comprising rollers or guides to facilitate sliding of the floor across said lower section, or the lower section of the frame comprises composite or low-friction materials.

18. The truck of claim 10, wherein the retractor is biased via a suitable biasing means, such as a spring, to exert a continuous retraction force on the floor.

19. The truck of claim 10, wherein the retractor is linked to the urger so that operation of the urger produces a corresponding retraction force on the floor.

20. A method for hauling particulate material with a particulate material haulage arrangement according to claim 1, said method comprising the steps of:
    loading particulate material into the tray;
    transporting the frame to a desired location via a suitable tractor; and
    activating the urger to urge the headwall from the head end of the tray towards the ejection end, so that the second end of the floor is retracted onto the retractor and the particulate material is ejected from the ejection end, said retractor agitating the floor during retraction to counteract adhesion of particulate material ejected from the tray.

\* \* \* \* \*